US010860391B2

(12) United States Patent
Shmulevich et al.

(10) Patent No.: US 10,860,391 B2
(45) Date of Patent: *Dec. 8, 2020

(54) SYSTEM AND METHOD FOR AUTOMATIC GENERATION OF SERVICE-SPECIFIC DATA CONVERSION TEMPLATES

(71) Applicant: Open Text SA ULC, Halifax (CA)

(72) Inventors: Igor A. Shmulevich, San Ramon, CA (US); Pero Smrzlic, Danville, CA (US)

(73) Assignee: OPEN TEXT SA ULC, Halifax (CA)

( * ) Notice: Subject to any disclaimer, the term of this patent is extended or adjusted under 35 U.S.C. 154(b) by 2 days.

This patent is subject to a terminal disclaimer.

(21) Appl. No.: 15/988,735

(22) Filed: May 24, 2018

(65) Prior Publication Data

US 2018/0307543 A1 Oct. 25, 2018

Related U.S. Application Data

(63) Continuation of application No. 13/594,553, filed on Aug. 24, 2012, now Pat. No. 10,002,032, which is a continuation of application No. 09/682,655, filed on Oct. 2, 2001, now Pat. No. 8,307,045.

(60) Provisional application No. 60/314,514, filed on Aug. 22, 2001.

(51) Int. Cl.
*G06F 9/54* (2006.01)

(52) U.S. Cl.
CPC .................................. *G06F 9/541* (2013.01)

(58) Field of Classification Search
CPC ...................................................... G06F 9/541
See application file for complete search history.

(56) References Cited

U.S. PATENT DOCUMENTS

| 4,754,428 A | 6/1988 | Schultz et al. |
|---|---|---|
| 4,811,207 A | 3/1989 | Hikita et al. |
| 5,210,824 A | 5/1993 | Putz et al. |
| 5,212,787 A | 5/1993 | Baker et al. |
| 5,226,161 A | 7/1993 | Khoyi et al. |
| 5,257,369 A | 10/1993 | Skeen et al. |
| 5,331,673 A | 7/1994 | Elko et al. |
| 5,339,392 A | 8/1994 | Risberg et al. |
| 5,421,015 A | 5/1995 | Khoyi et al. |

(Continued)

OTHER PUBLICATIONS

Kitts, "An Evaluation of Customer Retention and Revenue Forecasting in the Retail Sector: Investigation into the effects of Seasonality, Spending an Method" by DataSage, Inc., Oct. 25, 1999, 63 pgs.

(Continued)

*Primary Examiner* — Viet D Vu
(74) *Attorney, Agent, or Firm* — Sprinkle IP Law Group

(57) ABSTRACT

Methods for facilitating the creation of templates used to convert service data from a non-displayable format to alternate formats which are suited to be displayed on various client devices. In a preferred embodiment, the data corresponding to a selected service is examined to identify name-value pairs. A user is queried for a label corresponding to each pair. Formatting information for a plurality of client devices is contained in a master template. This information is used to generate a plurality of templates which are specific to the service data and the client devices and which are configured to convert the name-value pairs into formats adapted to be displayed on the corresponding devices.

20 Claims, 3 Drawing Sheets

(56) References Cited

U.S. PATENT DOCUMENTS

| | | | |
|---|---|---|---|
| 5,572,643 A | 11/1996 | Judson | |
| 5,704,017 A | 12/1997 | Heckerman et al. | |
| 5,710,727 A | 1/1998 | Mitchell | |
| 5,727,129 A | 3/1998 | Barrett et al. | |
| 5,732,218 A | 3/1998 | Bland et al. | |
| 5,740,430 A | 4/1998 | Rosenberg et al. | |
| 5,754,306 A | 5/1998 | Taylor | |
| 5,761,416 A | 6/1998 | Mandal et al. | |
| 5,774,660 A | 6/1998 | Brendel et al. | |
| 5,790,426 A | 8/1998 | Robinson | |
| 5,790,790 A | 8/1998 | Smith et al. | |
| 5,796,952 A | 8/1998 | Davis et al. | |
| 5,848,141 A * | 12/1998 | Beck | H04M 3/42 379/201.03 |
| 5,870,559 A | 2/1999 | Leshem et al. | |
| 5,878,223 A | 3/1999 | Becker et al. | |
| 5,884,282 A | 3/1999 | Robinson | |
| 5,918,014 A | 6/1999 | Robinson | |
| 5,958,008 A | 9/1999 | Pogrebisky et al. | |
| 5,987,480 A | 11/1999 | Donohue | |
| 6,012,052 A | 1/2000 | Altschuler et al. | |
| 6,041,311 A | 3/2000 | Chislenko et al. | |
| 6,049,777 A | 4/2000 | Sheena et al. | |
| 6,067,565 A | 5/2000 | Horvitz | |
| 6,085,226 A | 7/2000 | Horvitz | |
| 6,092,049 A | 7/2000 | Chislenko et al. | |
| 6,094,662 A | 7/2000 | Hawes | |
| 6,112,279 A | 8/2000 | Wang | |
| 6,128,665 A | 10/2000 | Iturralde | |
| 6,138,141 A | 10/2000 | DeSimone et al. | |
| 6,141,737 A | 10/2000 | Krantz et al. | |
| 6,151,608 A | 11/2000 | Abrams | |
| 6,151,624 A | 11/2000 | Teare et al. | |
| 6,182,083 B1 | 1/2001 | Scheifler | |
| 6,182,136 B1 | 1/2001 | Ramanathan et al. | |
| 6,185,586 B1 | 2/2001 | Judson | |
| 6,185,608 B1 | 2/2001 | Hon et al. | |
| 6,192,415 B1 | 2/2001 | Haverstock et al. | |
| 6,198,824 B1 | 3/2001 | Shambroom | |
| 6,272,492 B1 | 8/2001 | Kay et al. | |
| 6,330,319 B1 | 12/2001 | Moghnie | |
| 6,336,138 B1 * | 1/2002 | Caswell | H04L 41/12 345/440 |
| 6,374,247 B1 | 4/2002 | Gebauer | |
| 6,408,360 B1 | 6/2002 | Chamberlain et al. | |
| 6,571,246 B1 | 5/2003 | Anderson et al. | |
| 6,578,000 B1 | 6/2003 | Dodrill et al. | |
| 6,651,217 B1 | 11/2003 | Kennedy et al. | |
| 6,670,968 B1 | 12/2003 | Schlitt | |
| 6,671,746 B1 | 12/2003 | Northrup | |
| 6,697,844 B1 | 2/2004 | Chan et al. | |
| 6,701,428 B1 | 3/2004 | Harvey, III et al. | |
| 6,754,621 B1 | 6/2004 | Cunningham et al. | |
| 6,850,941 B1 | 2/2005 | White et al. | |
| 6,944,817 B1 | 9/2005 | Danneels | |
| 6,961,776 B1 | 11/2005 | Buckingham | |
| 7,051,316 B2 | 5/2006 | Charisius et al. | |
| 7,530,016 B2 | 5/2009 | Sahota et al. | |
| 7,756,727 B1 | 7/2010 | Greenspan et al. | |
| 8,307,045 B1 | 11/2012 | Shmulevich et al. | |
| 10,002,032 B2 | 6/2018 | Shmulevich et al. | |
| 2001/0016880 A1 | 8/2001 | Cai | |
| 2001/0032254 A1 | 10/2001 | Hawkins | |
| 2001/0034771 A1 | 10/2001 | Hutsch et al. | |
| 2002/0026359 A1 | 2/2002 | Long | |
| 2002/0032706 A1 | 3/2002 | Perla | |
| 2002/0046228 A1 | 4/2002 | Scheifler | |
| 2002/0049833 A1 | 4/2002 | Kikinis | |
| 2002/0052980 A1 * | 5/2002 | Sanghvi | G06F 9/542 719/318 |
| 2002/0065109 A1 | 5/2002 | Mansikkaniemi et al. | |
| 2002/0065912 A1 | 5/2002 | Catchpole et al. | |
| 2002/0073119 A1 | 6/2002 | Richard | |
| 2002/0078168 A1 | 6/2002 | Christfort et al. | |
| 2002/0138582 A1 | 9/2002 | Chandra et al. | |
| 2002/0143820 A1 | 10/2002 | Van Eaton | |
| 2002/0164983 A1 | 11/2002 | Raviv | |
| 2002/0165877 A1 | 11/2002 | Malcolm et al. | |
| 2002/0178187 A1 | 11/2002 | Rasmussen et al. | |
| 2002/0184610 A1 | 12/2002 | Chong et al. | |
| 2002/0199123 A1 | 12/2002 | McIntyre | |
| 2003/0009250 A1 | 1/2003 | Resnick | |
| 2003/0023755 A1 | 1/2003 | Harris | |
| 2003/0028451 A1 | 2/2003 | Ananian | |
| 2003/0033377 A1 | 2/2003 | Chatterjee et al. | |
| 2003/0060896 A9 | 3/2003 | Hulai et al. | |
| 2003/0217117 A1 | 11/2003 | Dan et al. | |
| 2004/0030697 A1 | 2/2004 | Cochran et al. | |
| 2004/0205452 A1 * | 10/2004 | Fitzsimons | G06F 17/3089 715/255 |
| 2006/0010373 A1 | 1/2006 | Burns | |
| 2006/0074944 A1 | 4/2006 | Stark et al. | |
| 2010/0161826 A1 | 6/2010 | Miner | |

OTHER PUBLICATIONS

Kitts, "RMS Revenue and Retention Forecasting Final Phase Model Specification" by DataSage, Inc., Jan. 31, 2000, 16 pgs.
DataSage, Inc., "DataSage Customer Analyst," Progressive Grocer, 1998, 2 pgs.
Montgomery, et al., "Estimating Price Elasticities with Theory-Based Priors," J. Marketing Research, vol. 36, pp. 413-423, Nov. 1999.
Simon, "Price Management," Elsevier Sci. Pub., pp. 13-41, 1989.
Subrahmanyan and Shoemaker, "Developing Optimal Pricing and Inventory Policies for Retailers Who Face Uncertain Demand," J. Retailing, vol. 72, pp. 7-30, 1996.
Vilcassim and Chintagunta, "Investigating Retailer Product Category Pricing from Household Scanner Panel Data," J. Retailing, vol. 71, pp. 103-128, 1995.
Weinstein, "Tackling Technology, managing data and systems integration seen as major retail focus in 1999," Progressive Grocer, 1999.
Wellman, "Down in the (Data) Mines," Supermarket Business, pp. 33-35, May 1999.
Amato-McCoy, "New Customer Management System Returns Lost Sales to Dick's," RT Magazine, Jun. 1999.
Miller, M., "Applications Integration: Getting It Together," PC Magazine, Feb. 8, 1994, pp. 111-112, 116-120, 136, 138.
Rapoza, "PointCast 2.0 Eases Burden on Network: improvements in interface performance make it a solid upgrade," 2 pgs., PC Week, Jun. 2, 1997.
Strom, David, "The Best of Push," 6 pgs., Apr. 1997.
Aragon, "When Shove Comes to Push," 5 pgs., PC Week, Feb. 10, 1997.
thirdvoice.com—Home Page and Frequently Asked Questions (7 pages), www.thirdvoice.com, www.thirdvoice.com/help/20/faq.htm, 2000.
Office Action for U.S. Appl. No. 09/682,655, dated Jan. 28, 2004, 9 pgs.
Office Action for U.S. Appl. No. 09/682,655, dated May 3, 2004, 9 pgs.
Office Action for U.S. Appl. No. 09/682,655, dated Jan. 6, 2005, 12 pgs.
Office Action for U.S. Appl. No. 09/682,655, dated Jun. 21, 2005, 14 pgs.
Office Action for U.S. Appl. No. 09/682,655, dated Dec. 7, 2005, 18 pgs.
Office Action for U.S. Appl. No. 09/682,655, dated Jun. 14, 2006, 19 pgs.
Liu et al., "XWRAP: an XML-enabled Wrapper Construction System for Web Information Sources," Proceedings, 16th Int'l Conf. on Data Eng., pp. 611-621, Feb. 29-Mar. 3, 2000, Data Engineering.
Jaxo Ltd. XGate—White Paper: The enterprise, its data and XGate, www.jaxo.com, Dec. 6, 1998, pp. 1-23.
Appeal Brief for U.S. Appl. No. 09/682,655, dated Jan. 4, 2007, 41 pgs.

(56) References Cited

OTHER PUBLICATIONS

Examiner's Answer for U.S. Appl. No. 09/682,655, dated Sep. 11, 2007, 35 pgs.
Reply to Examiner's Answer for U.S. Appl. No. 09/682,655, dated Oct. 10, 2007, 16 pgs.
Second Examiner's Answer for U.S. Appl. No. 09/682,655, dated Nov. 6, 2007, 35 pgs.
Reply to Examiner's Answer for U.S. Appl. No. 09/682,655, dated Nov. 27, 2007, 2 pgs.
Reply to Second Examiner's Answer for U.S. Appl. No. 09/682,655, dated Jan. 4, 2008, 18 pgs.
Decision on Appeal for U.S. Appl. No. 09/682,655, dated Feb. 16, 2010, 15 pgs.
Office Action for U.S. Appl. No. 09/682,655, dated Sep. 14, 2010, 17 pgs.
Office Action for U.S. Appl. No. 09/682,655, dated Feb. 15, 2011, 11 pgs.
U.S. Appl. No. 60/263,574, A software platform and process for designing, deploying and managing mobile applications, Srinivas Mandayam, Covigo Confidential, Jan. 22, 2001, 155 pgs.
Office Action for U.S. Appl. No. 09/682,655, dated May 24, 2011, 4 pgs.
Office Action for U.S. Appl. No. 09/682,655, dated Sep. 12, 2011, 11 pgs.
Office Action for U.S. Appl. No. 09/682,655, dated Jan. 23, 2012, 15 pgs.
Office Action for U.S. Appl. No. 13/594,553, dated Oct. 17, 2013, 12 pgs.
U.S. Appl. No. 60/230,489, OracleMobile Mobile Portal Platform, Sep. 6, 2000, 70 pgs.
Saha, et al., Bringing the Wireless Internet to Mobile Devices, 2001, IEEE, 5 pgs.
Office Action for U.S. Appl. No. 13/594,553, dated Apr. 1, 2014, 10 pgs.
Office Action for U.S. Appl. No. 13/594,553, dated Sep. 9, 2015, 13 pgs.
Office Action for U.S. Appl. No. 13/594,553, dated Mar. 16, 2016, 13 pgs.
Office Action for U.S. Appl. No. 13/594,553, dated Aug. 19, 2016, 7 pgs.
Office Action for U.S. Appl. No. 13/594,553, dated Dec. 7, 2016, 9 pgs.
Office Action for U.S. Appl. No. 13/594,553, dated Apr. 11, 2017, 7 pgs.
Office Action for U.S. Appl. No. 13/594,553, dated Sep. 11, 2017, 7 pgs.

* cited by examiner

SYSTEM AND METHOD FOR AUTOMATIC GENERATION OF SERVICE-SPECIFIC DATA CONVERSION TEMPLATES

CROSS-REFERENCE TO RELATED APPLICATIONS

This application is a continuation of, and claims a benefit of priority under 35 U.S.C. 120 from U.S. patent application Ser. No. 13/594,553, filed on Aug. 24, 2012, issued as U.S. Pat. No. 10,002,032, entitled "SYSTEM AND METHOD FOR AUTOMATIC GENERATION OF SERVICE-SPECIFIC DATA CONVERSION TEMPLATES," which is a continuation of, and claims a benefit of priority under 35 U.S.C. 120 from U.S. patent application Ser. No. 09/682,655, filed on Oct. 2, 2001, issued as U.S. Pat. No. 8,307,045, entitled "SYSTEM AND METHOD FOR AUTOMATIC GENERATION OF SERVICE-SPECIFIC DATA CONVERSION TEMPLATES USING A MASTER STYLE TEMPLATE," which, in turn, claims a benefit of priority under 35 U.S.C. § 119(e) of U.S. Provisional Application No. 60/314,514, filed on Aug. 22, 2001, entitled "METHOD FOR CREATING TEMPLATES TO CONVERT DATA INTO TARGET MARKUP LANGUAGES". All applications referenced in this paragraph are hereby incorporated by reference as if set forth herein in their entireties.

TECHNICAL FIELD

The invention relates generally to methods for communicating data and more particularly to methods for generating templates for the conversion of XML and other non-display-formatted data to formats which are suitable for presentation on specific devices or classes of devices which utilize corresponding mark-up languages.

BACKGROUND OF THE RELATED ART

The Internet has become a powerful tool for disseminating information. Although the Internet was originally used to communicate scientific and technical data, increased numbers of service providers, improved applications for retrieving data and user-friendly interfaces have made it a useful tool for millions upon millions of users. It is commonly used by people of all ages for transmitting and receiving messages, for research, for shopping and for surfing (browsing) the Internet.

The increased popularity of the Internet is due in part to the amount of information which is available, and in part to the convenience with which people can access this information. Generally speaking, the information is accessed with browsers of various types. Traditionally, browsers have been computer-based applications which provide user interfaces to the Internet. These browsers are configured to request information from servers which are also connected to the Internet. The browsers typically communicate with the servers using a protocol known as hypertext transfer protocol, or HTTP. The servers, in turn, provided their information to the browsers via text and data which is marked or tagged so that the browser can format it for display to the user. This formatting information is typically provided through the use of hypertext markup language (HTML) tags that indicate which pieces of information should be formatted in a given manner.

The use of HTML to provide formatting information to the browsers allows the same information to be transmitted to different types of browsers which have different capabilities, yet still be presented to the user in a readable/viewable fashion, adapted to the capabilities of the respective browsers. As a result, information providers do not have to tailor the format of their information to a particular type of browser and thereby limit the dissemination of the information. Instead, they can provide information in a single format which is accessible by a much greater user population.

The accessibility of Internet-based information has increased further with recent developments in browser technology. Browsers can be incorporated into portable, wireless devices so that users can access the Internet without being tied to a PC. For example, some cellular phones and personal digital assistants (PDAs) incorporate Web browsers. Information which is transmitted to these browsers typically incorporates wireless markup language (WML), rather than HTML tags.

One of the difficulties in accommodating all of these different types of client devices is that each of them may use a different markup language which is specifically adapted to the capabilities of the corresponding device. A mechanism must therefore be provided to enable the conversion of generic data to the appropriate markup language for each of the devices. Typically, this mechanism is provided through a set of templates, wherein each of the templates is configured to convert the generic data into a corresponding markup language.

There are several drawbacks to the use of these templates. One of these drawbacks relates to the fact that each of the templates is configured to convert data corresponding to one particular service into a markup language corresponding to one particular client device. Whenever it is desired to enable the transfer of data to a new client device, or to transfer data corresponding to a new service to the existing client, it is necessary to generate a new set of templates which is configured to make the required content transformations. It should be noted that, to support a single new client device, a set of templates corresponding to each of the available services is necessary. Likewise, in order to support a single new data service, a set of templates corresponding to each supported client device is necessary. Because the creation of new templates (typically using JSP or ASP technology) is difficult, the need to create a new set of templates for each new client device or service presents a daunting task.

SUMMARY

One or more of the problems outlined above may be solved by the various embodiments of the invention. Broadly speaking, the invention comprises systems and methods for enabling the automatic creation of templates which are then used to convert service data from a non-displayable generic format to alternate formats which are suited to be displayed on various client devices. In a preferred embodiment, a master template corresponding to a set of devices is generated. The master template contains information relating to these devices which enable it to generate individual templates corresponding to specific service data and specific devices (or device classes). When it is desired to provide data corresponding to a new service to the client devices, the data corresponding to the new service is examined to identify its structure, specifically name-value pairs. A user is prompted to accept a default label (the name from the name-value pair) or provide a new label corresponding to each pair. The user may select all or part of the service data to be used with the individual templates that will be generated. Based upon the service data and the information provided by the user, the master template is used to generate a service-specific template for each specific device class, wherein each template is configured to convert the service data into markup language data suitable for display on a corresponding device. The method thereby enables the automatic generation of templates for the conversion of the service data to markup language files that can be displayed on different client devices.

In one embodiment, a method comprises examining service data and using a master template to generate service-specific templates for each of a plurality of devices or device classes. A master template is constructed to define a style for presentation of data on the devices. Service data such as XML data is examined to identify name-value pairs (XML tags and the information enclosed by the tags). The user is queried for labels that will be associated with these pairs. The XML tag corresponding to each pair may be used as a default label if no alternative is provided by the user. Based upon this information and the information contained in the master template, a plurality of device templates, each of which is associated with a specific type or class of devices, are generated. Each device template is configured to receive the service data and convert this data into a markup language format which is suitable for display on the associated device type. The method thereby eliminates the need to manually construct an individual device template for each device type whenever it is desired to provide a new data service.

Another embodiment of the invention comprises a software application. The software application is embodied in a computer-readable medium such as a floppy disk, CD-ROM, DVD-ROM, RAM, ROM, database schemas and the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
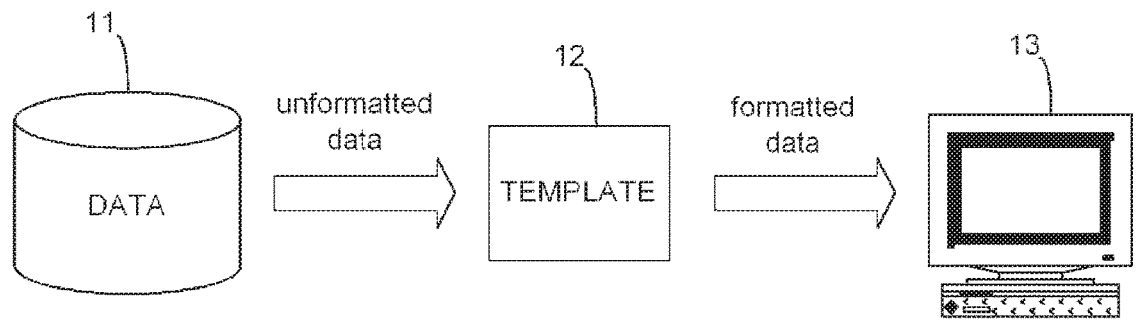
FIG. 1 is a diagram illustrating the conversion of generic data into a format which is suitable for display on a selected client device.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the invention as defined by the appended claims.

DETAILED DESCRIPTION

A preferred embodiment of the invention is described below. It should be noted that this and any other embodiments described below are exemplary and are intended to be illustrative of the invention rather than limiting.

Broadly speaking, the invention comprises systems and methods for facilitating the communication of data which must be converted into a markup language in order to make it suitable for display on a receiving device. The present techniques allow templates to be quickly created for the conversion of data such as XML-formatted data into markup languages which are suitable for use with one or more corresponding devices. For example, information which is formatted as XML data may need to be converted to HTML before it can be viewed on a full-size browser such as Netscape. If, on the other hand, the data is to be transmitted to a wireless device, the data may need to be converted to a particular form of WML in order to be properly displayed on that device.

Instead of manually generating individual templates to convert generic data for each service into each markup language which may need to be provided to a client device, a master template can be used to generate an individual template for each group of similar devices requiring a specific markup language and relying on a specific user interface pattern. Each individual template corresponds to a particular device type and a particular service. Individual templates corresponding to new data services can therefore be automatically generated.

Raw data may be delimited in a way that it is not easily human-readable. For example, a series of values may be separated by semicolons or some other delimiter (e.g., "first name; last name; . . . "). When a database engine reads this data, it is aware based upon the database schema that the first value corresponds to a first variable, the second value corresponds to a second variable, and so on (e.g., the first value is a first name, the second value is a last name, . . . ).

In XML, the values are delimited by text tags which identify the corresponding variables. The tags have the form "<tag_name>" and "</tag_name>", where the former delimits the beginning of the value and the latter delimits the end of the value. For example, if the variable "first_name" has the value "John", this would typically appear in XML as <first_name>John</first_name>".

XML differs from earlier in data formats in that it is easily human-readable, and that it is easy to program an application that understands the XML data and does something with it. An application could, for example, read data formatted as described above and identify the first_name and last name values, handling each one in a manner which is appropriate for the application. This may consist of re-ordering the names, presenting them in a particular font, or using or manipulating the values in any other way. The application simply has to look for the appropriate tags and read the information which is enclosed by them. There is no need for special database drivers or software which allow the data to be read.

The use of tags in XML is very similar to the use of tags in HTML. In XML, however, the tags are used only for the purposes of delimiting and identifying data. The tags do not define presentation information, such as font, color, position on a page, etc. In other words, the tags do not serve a markup purpose as they do in HTML and other markup languages. Below is an example of XML data for a weather reporting service.

```
<weather_report>
    <day_of_week>Monday</day_of_week>
    <temperature>75</temperature>
    <wind_speed>10</wind_speed>
</weather_report>
```

This data corresponds to a service which provides data relating to particular weather conditions. The data for a given report is preceded by the opening tag <weather_report> and is followed by the </weather_report> tag. The individual pieces of data within the report are each enclosed by tags identifying the data.

It should be noted that, for the purposes of this disclosure, the term "unformatted data" will be used to refer to XML or similar data despite the use of identifying tags. (This data could alternately be referred to as "non-display-formatted" data.) This data is referred to as unformatted because it does not contain information relating to the manner in which the data should be formatted for the purposes of presentation. For example, it does not have tags identifying tables, cells within tables, fonts, colors, or other information that would be used to control the presentation of the data to a user.

Referring to FIG. 1, a diagram illustrating the conversion of generic data into a format which is suitable for display on a selected client device is shown. As shown in this figure, generic, unformatted data corresponding to a selected service is retrieved from a storage device 11. This data may be one of several forms which are, for the purposes of this disclosure, considered to be unformatted. That is, they are not in a format which is suitable for display on the client device. The data may, for example, be in the form of a table (e.g., wherein individual cells are separated by commas, spaces or other delimiters) or, more commonly, in the form of XML data. The unformatted data is converted, using XSL template 12 into formatted data which is suitable for display on a client device 13. (XSL is also sometimes referred to as XSLT—extensible stylesheet language transformation.)

Figure 2:
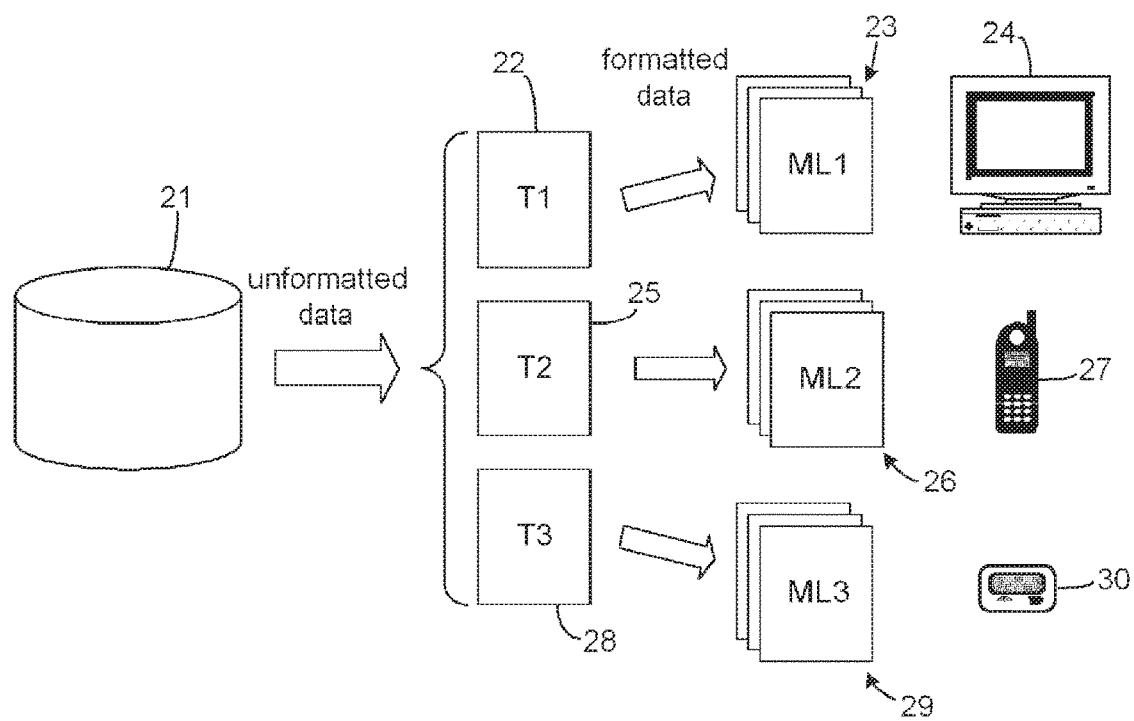
FIG. 2 is a diagram illustrating the conversion of generic data into a plurality of different formats, each of which is suitable for display on a different client device.

As indicated above, the server must be capable of providing data to a variety of different types of clients. For example, the client may be a PC running a full-scale Internet browser such as Netscape, or it may be a cellular phone which has a browser with limited screen area and features. The client device may even be a two-way pager which can only display one or two lines of text at a time. A separate XSL template is needed for each of these devices. This is illustrated in FIG. 2. In this figure, data from storage device 21 may be processed by a first template 22 to produce a set of HTML-formatted web pages 23 that can be displayed on the browser running on PC 24. On the other hand, the data from device 21 may be processed by template 25 to generate WML data 26 which is suitable for display on the browser of cellular phone 27. Likewise, the data can be processed by template 28 to produce data 29 which can be displayed within the device limitations of two-way pager 30. (It should be noted that FIG. 2 depicts only a few of the many different devices and corresponding markup language is for which the server may be needed to provide data.)

One embodiment of the intention involves the use of a master template from which individual templates can be generated. These individual templates can then be used to convert unformatted (e.g., XML) data into a format which is suitable for presentation via a corresponding client device. This is illustrated in FIG. 3.

Figure 3:
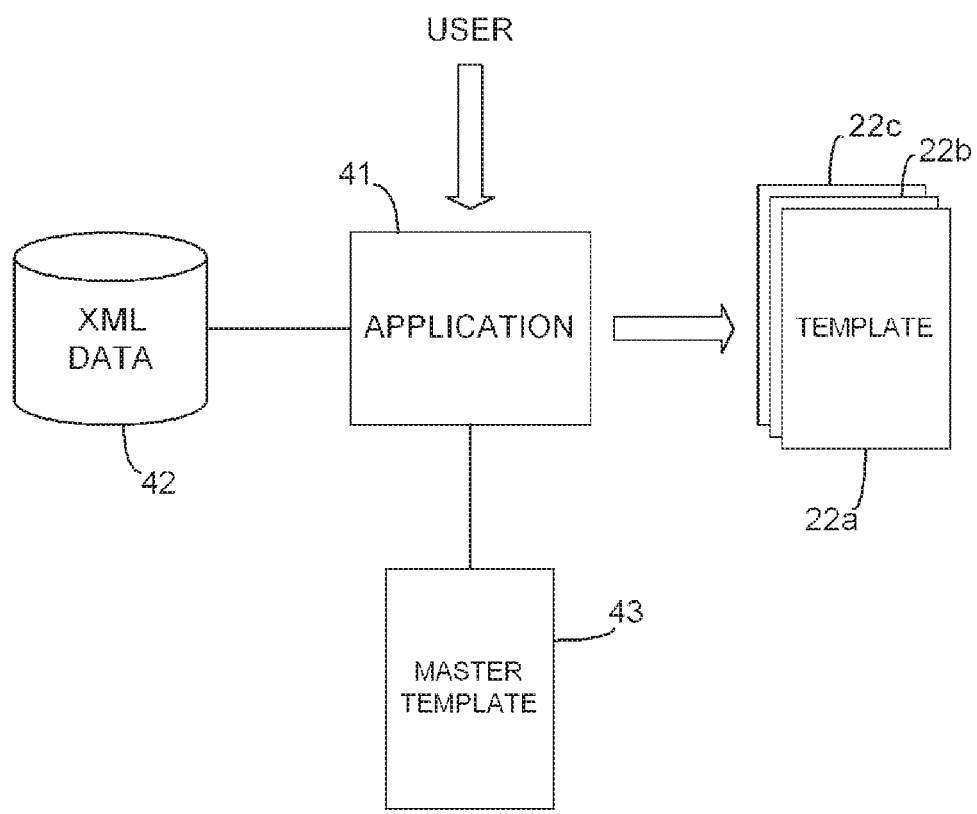
FIG. 3 is a diagram illustrating a system according to one embodiment of the invention which is configured to generate a master template for the conversion of service data to various presentation formats.

FIG. 3 is a diagram illustrating a system according to one embodiment of the invention which is configured to generate a master template for the conversion of service data to various presentation formats. In this embodiment, an application 41 is configured to receive unformatted data 42 corresponding to a data service, examine this data and, based upon user input and a master template 43, generate a individual, service/device-specific templates 22.

It should be noted that, for the purposes of this disclosure, identical items in the figures may be indicated by identical reference numerals followed by a lowercase letter, e.g., 22a, 22b, and so on. The items may be collectively referred to herein simply by the reference numeral.

Master template 43 contains information that defines the manner in which data for the selected service is presented, as well as information on the presentation capabilities of the client devices. Master template 43 is not intended to be used to directly convert unformatted data to a particular markup language. It is instead intended to provide building blocks from which the individual templates (which are intended to convert the unformatted data into formatted data) can be constructed. The master template is used in conjunction with a software application (a "wizard") which identifies the name-value pairs in the service data and selects the building blocks from the master template which are necessary to generate the formatting for these name-value pairs.

"Name value pairs" is used here to refer generally to the generic format of the service data. It should be noted that the data may be in a more sophisticated format in some instances. For example, wind data could be presented in XML as

```
<WindSpeed>5</WindSpeed>
<WindDirection>NW</WindDirection>
or
<Wind>
    <Speed>5</Speed><Direction>NW</Direction>
</Wind>
```

The template wizard can be configured to handle either format.

It should also be noted that the XML data may contain pictures or other multimedia content. For instance, the weather conditions "Sunny" and "Cloudy" could be represented by sunshine or cloud icons, respectively. The wizard can be configured to display the icons on devices which have the appropriate graphics capabilities, while the words (e.g., "Sunny" or "Cloudy" could be displayed on devices which don't have the capability to display icons.

The master template follows a predetermined style. When the master template is written, the author chooses the manner in which data will be displayed. For example, it may be written to display name-value pairs as rows in a table. Different types of data may be handled differently. For instance, report headings may be displayed in a larger font than other data. The style may be adapted to each of the devices for which the master template will be used to create individual templates since the formatting for each type of data is defined in a separate building block.

Figure 4:
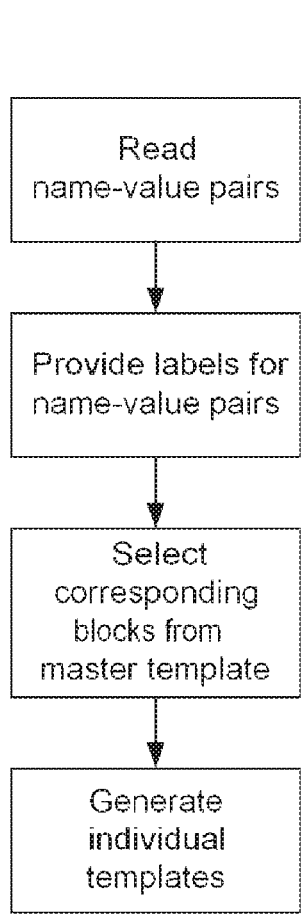
FIG. 4 is a flow diagram illustrating a method in accordance with one embodiment of the invention.

Referring to FIG. 4, a flow diagram illustrating a method in accordance with one embodiment of the invention is shown. In this embodiment, the method essentially comprises examining data which corresponds to a particular type of service, assigning appropriate labels to the different pieces of data provided via the service, retrieving the corresponding building blocks from the master template and assembling the building blocks to generate templates which can be used to create markup language files for corresponding devices.

Figure 5:
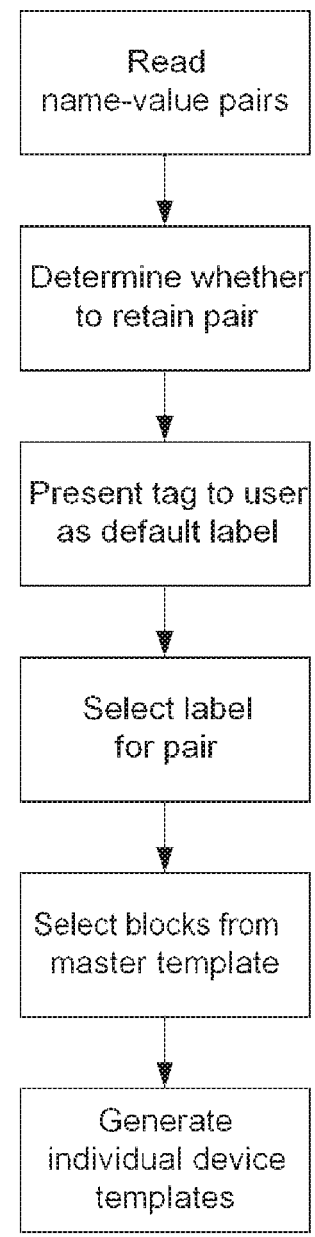
FIG. 5 is a more detailed flow diagram illustrating a method in accordance with another embodiment of the invention.

Referring to FIG. 5, a more detailed flow diagram illustrating a method in accordance with another embodiment of the invention is shown. In this embodiment, the service data is formatted as XML data. This data is examined to identify name-value pairs which are present. For each of these pairs (or each name associated with one of these pairs), the user the first determines whether or not it is desired to retain the name-value pair. It may not be desirable to provide all of the information to the client devices, so some of the data may simply be discarded. In this manner, the data may be filtered. If a particular name-value pair is to be retained, the user is presented with the name (the XML tag) from the XML file and is given the option of accepting this name or modifying it for purposes of the individual markup languages. For example, if the tag is "day", the user may choose to use a tag which is more informative, such as "day of the week". Once the user has selected either the default or a new label, that label is used for the corresponding name-value pair. Based on the type of the name-value pair, the appropriate building block for each device is selected from the master template. The building blocks for each device are then assembled into a template for that device. Each template is specific to the corresponding device and the particular service associated with the data. In the preferred embodiment, a services wizard application is configured to examine the data for a new service and to automatically generate service-specific templates for each of the device types for which building blocks are defined in the master template. The individual templates may correspond to individual devices, or to classes of devices which can utilize data that is formatted according to the same markup language and device presentation capabilities. In alternative embodiments, the individual templates may be generated as needed rather than automatically upon completion of the master template.

In the preferred embodiment, there is a single master template. The master template defines a single style (which may vary somewhat from device to device) which is embodied in the individual, service/device-specific templates. When it is desired to support a new type of client device, the master template must be updated (or a few one written) to include building blocks corresponding to that device. These building blocks can then be used to define a service-specific template for the new device. It is contemplated that, in an alternate embodiment, several master templates may be provided, wherein each defines a different style for the presentation of service data. A user could then be prompted by the wizard application to select a style (master template) according to which the individual templates will be generated.

The invention may provide many advantages over prior art methods. For example, although XML provides a mechanism for enabling the definition, transmission, interpretation, etc. of data between disparate applications and thereby simplify the interfaces between such applications, XML is widely regarded as a very unforgiving language. Consequently, it is typically very tedious and time consuming to manually construct the templates necessary for the generation of markup-language data which is suitable for display on the different client devices to which a server may provide data. The time and cost associated with the generation of these templates can make XML-based server solutions unattractive to users in spite of other advantages they might provide. By providing a means for the automatic generation of templates to accommodate new data services, the present methods may eliminate this disadvantage.

The benefits and advantages which may be provided by the invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the invention has been described with reference to particular embodiments, it should be understood that the embodiments are illustrative and that the scope of the invention is not limited to these embodiments. Many variations, modifications, additions and improvements to the embodiments described above are possible. Particularly, these variations may include computers or other data processing devices, computer readable media (such as floppy disks, CD-ROMs, DVD-ROMs, etc.) storage devices, computer memories and the like which contain software, firmware or other programming embodying the foregoing methods. It is contemplated that these variations, modifications, additions and improvements fall within the scope of the invention as detailed within the following claims.

What is claimed is:

1. A system, comprising:
a processor;
a non-transitory computer readable storage medium; and
stored instructions translatable by the processor to perform:
receiving unformatted service data corresponding to a new type of data service;
updating a master template to include template building blocks corresponding to a device type, the template building blocks configured for constructing individual templates, wherein the master template is system-generated and follows a predetermined presentation style, the template building blocks containing information that defines the predetermined presentation style for presenting the new type of data service on devices of the device type, the information including presentation capabilities of the device type;
examining the unformatted service data to identify types of data in the unformatted service data;
based on the types of data in the unformatted service data, selecting, from the master template, template building blocks necessary to generate formatting for the types of data in the unformatted service data, wherein formatting for each type of data is defined in a separate template building block; and
generating a service-specific data conversion template for the device type utilizing the template building blocks selected from the master template, wherein the service-specific data conversion template for the device type contains information from the template building blocks for converting the unformatted service data corresponding to the new type of data service into a format suitable for presentation on a client device of the device type.

2. The system of claim 1, wherein the master template is one of a plurality of master templates, the plurality of master templates defining different presentation styles for presenting the new type of data service on the type of client device.

3. The system of claim 1, wherein the stored instructions are further translatable by the processor to perform:
generating a plurality of service-specific templates for a plurality of device types, the master template containing information on presentation capabilities of the plurality of device types, the automatically generating utilizing the template building blocks selected from the master template, each of the plurality of service-specific templates containing information for converting the unformatted service data corresponding to the new type of data service into a format suitable for presentation on a device having one of the plurality of device types.

4. The system of claim 1, wherein the stored instructions are further translatable by the processor to perform:
converting the unformatted service data corresponding to the new type of data service into markup language data utilizing the service-specific template for the device type, the markup language data suitable for display on the client device of the device type.

5. The system of claim 1, wherein the unformatted service data corresponding to the new type of data service comprises name-value pairs and wherein the selecting comprises selecting an appropriate template building block for the device type from the master template based on a name-value pair type.

6. The system of claim 1, wherein the unformatted service data corresponding to the new type of data service comprises Extensible Markup Language (XML)-formatted data.

7. The system of claim 1, wherein the client device comprises a desktop computer, a personal computer, a cellular phone, a pager, or a mobile device.

8. A method, comprising:
receiving, by a computer, unformatted service data corresponding to a new type of data service;
updating, by the computer, a master template to include template building blocks corresponding to a device type, the template building blocks configured for constructing individual templates, wherein the master template is system-generated and follows a predetermined presentation style, the template building blocks containing information that defines the predetermined presentation style for presenting the new type of data service on devices of the device type, the information including presentation capabilities of the device type;
examining, by the computer, the unformatted service data to identify types of data in the unformatted service data;
based on the types of data in the unformatted service data, selecting, by the computer from the master template, template building blocks necessary to generate formatting for the types of data in the unformatted service data, wherein formatting for each type of data is defined in a separate template building block; and
generating, by the computer, a service-specific data conversion template for the device type utilizing the template building blocks selected from the master template, wherein the service-specific data conversion template for the device type contains information from the template building blocks for converting the unformatted service data corresponding to the new type of data service into a format suitable for presentation on a client device of the device type.

9. The method according to claim 8, wherein the master template is one of a plurality of master templates, the plurality of master templates defining different presentation styles for presenting the new type of data service on the type of client device.

10. The method according to claim 8, further comprising:
generating a plurality of service-specific templates for a plurality of device types, the master template containing information on presentation capabilities of the plurality of device types, the automatically generating utilizing the template building blocks selected from the master template, each of the plurality of service-specific templates containing information for converting the unformatted service data corresponding to the new type of data service into a format suitable for presentation on a device having one of the plurality of device types.

11. The method according to claim 8, further comprising:
converting the unformatted service data corresponding to the new type of data service into markup language data utilizing the service-specific template for the device type, the markup language data suitable for display on the client device of the device type.

12. The method according to claim 8, wherein the unformatted service data corresponding to the new type of data service comprises name-value pairs and wherein the selecting comprises selecting an appropriate template building block for the device type from the master template based on a name-value pair type.

13. The method according to claim 8, wherein the unformatted service data corresponding to the new type of data service comprises Extensible Markup Language (XML)-formatted data.

14. The method according to claim 8, wherein the client device comprises a desktop computer, a personal computer, a cellular phone, a pager, or a mobile device.

15. A computer program product comprising a non-transitory computer-readable medium storing instructions translatable by a processor to perform:
receiving unformatted service data corresponding to a new type of data service;
updating a master template to include template building blocks corresponding to a device type, the template building blocks configured for constructing individual templates, wherein the master template is system-generated and follows a predetermined presentation style, the template building blocks containing information that defines the predetermined presentation style for presenting the new type of data service on devices of the device type, the information including presentation capabilities of the device type;
examining the unformatted service data to identify types of data in the unformatted service data;
based on the types of data in the unformatted service data, selecting, from the master template, template building blocks necessary to generate formatting for the types of data in the unformatted service data, wherein formatting for each type of data is defined in a separate template building block; and
generating a service-specific data conversion template for the device type utilizing the template building blocks selected from the master template, wherein the service-specific data conversion template for the device type contains information from the template building blocks for converting the unformatted service data corresponding to the new type of data service into a format suitable for presentation on a client device of the device type.

16. The computer program product of claim 15, wherein the master template is one of a plurality of master templates, the plurality of master templates defining different presentation styles for presenting the new type of data service on the type of client device.

17. The computer program product of claim 15, wherein the instructions are further translatable by the processor to perform:

generating a plurality of service-specific templates for a plurality of device types, the master template containing information on presentation capabilities of the plurality of device types, the automatically generating utilizing the template building blocks selected from the master template, each of the plurality of service-specific templates containing information for converting the unformatted service data corresponding to the new type of data service into a format suitable for presentation on a device having one of the plurality of device types.

18. The computer program product of claim 15, wherein the instructions are further translatable by the processor to perform:

converting the unformatted service data corresponding to the new type of data service into markup language data utilizing the service-specific template for the device type, the markup language data suitable for display on the client device of the device type.

19. The computer program product of claim 15, wherein the unformatted service data corresponding to the new type of data service comprises name-value pairs and wherein the selecting comprises selecting an appropriate template building block for the device type from the master template based on a name-value pair type.

20. The computer program product of claim 15, wherein the unformatted service data corresponding to the new type of data service comprises Extensible Markup Language (XML)-formatted data.

* * * * *